Nov. 28, 1950     W. E. BRADLEY     2,532,221
PULSE MODULATED ECHO RANGING SYSTEM
Filed Jan. 16, 1945     2 Sheets-Sheet 1
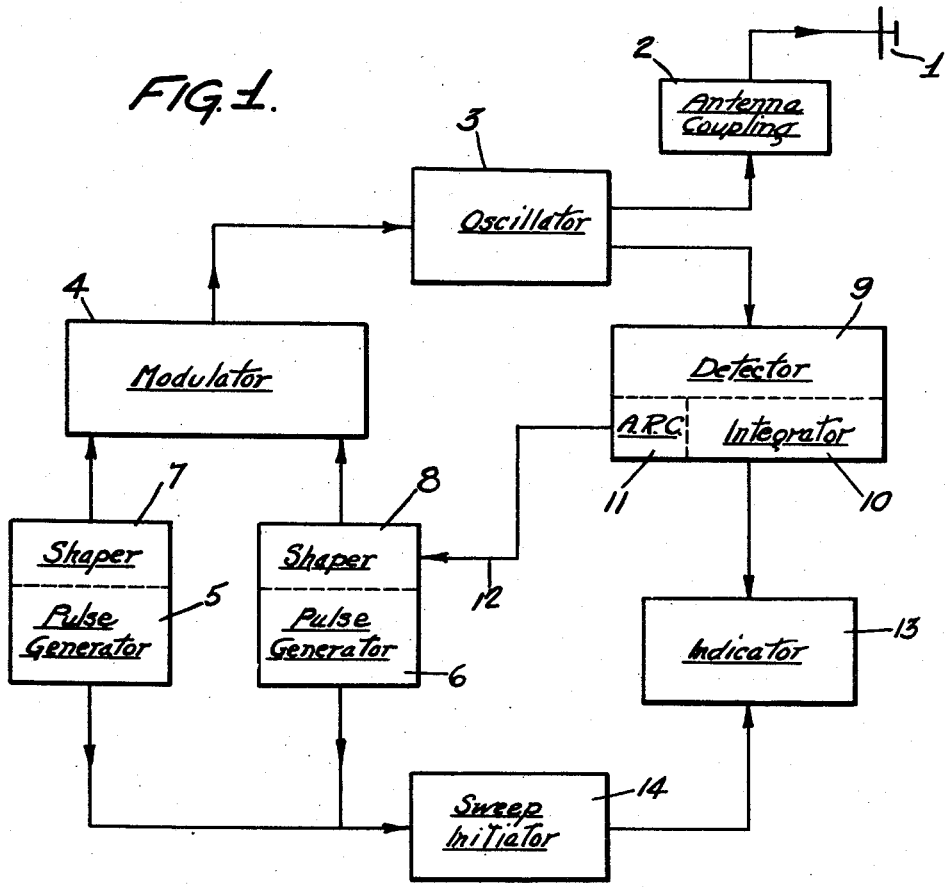
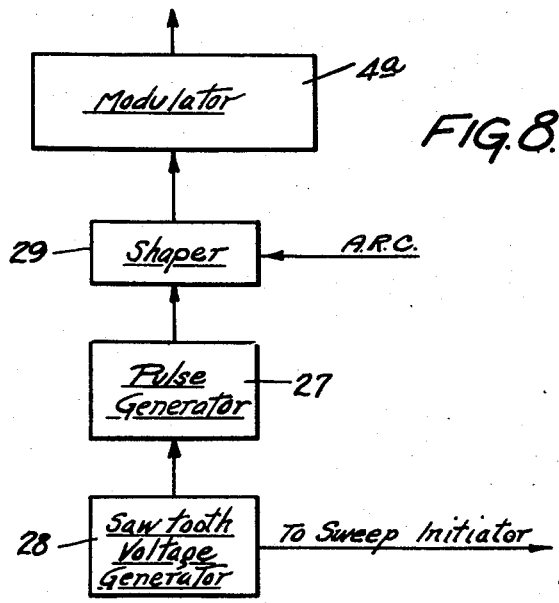
Inventor:
William E Bradley
by his Attorneys
Howson & Howson Nov. 28, 1950 W. E. BRADLEY 2,532,221
PULSE MODULATED ECHO RANGING SYSTEM
Filed Jan. 16, 1945 2 Sheets-Sheet 2
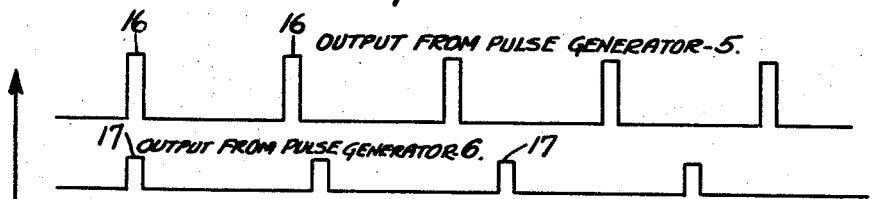
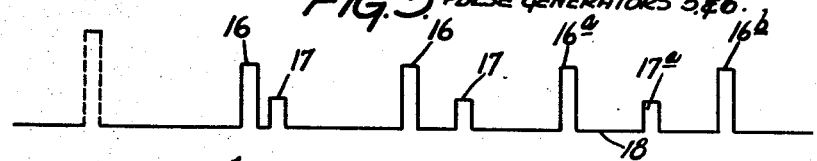
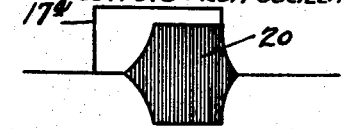
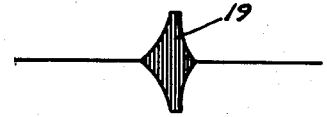
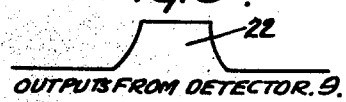
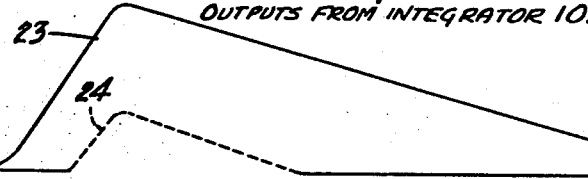
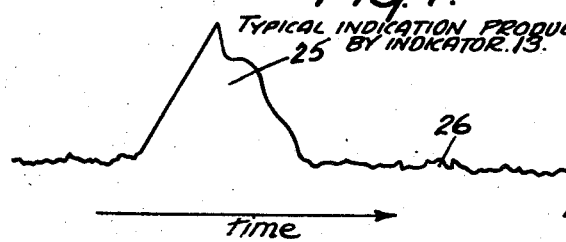

Patented Nov. 28, 1950

2,532,221

UNITED STATES PATENT OFFICE 2,532,221

PULSE MODULATED ECHO RANGING SYSTEM

William E. Bradley, Swarthmore, Pa., assignor, by mesne assignments, to Philco Corporation, Philadelphia, Pa., a corporation of Pennsylvania Application January 16, 1945, Serial No. 572,999

8 Claims. (Cl. 343—13)

This invention relates to radio detecting and ranging (radar) systems, and more particularly, to a novel method and apparatus for use in such systems.

Prior systems of this character have generally been characterized in that they have employed separate transmitting and receiving units, and in order to utilize a single antenna both for transmitting signals and for receiving the reflected signals from a reflecting object, such systems have also employed a T-R (Transmit-Receive) box, as is well known to those skilled in the art. The employment of the separate transmitting and receiving units and the T-R box has added materially to the size, weight, and cost of the apparatus, since these parts are bulky, heavy and expensive. This is a serious objection, especially in the case of radar apparatus employed on moving craft, or vehicles such as aircraft, where space and weight are very important factors.

The principal object of the present invention is to provide a novel method and apparatus which enables the use of a single transmitter and receiver unit of simple construction, and which eliminates the necessity of utilizing a T-R box, thereby greatly simplifying and reducing the size, weight and cost of the apparatus.

Another object of the invention is to provide a novel apparatus which enables the use of a slow-scanning indicator, thus affording a selection of various known indicators.

According to the present invention, an oscillator is made to serve both as a transmitter and as a receiver. This is accomplished by generating, during each operating cycle, a succession of pulses whose time spacing varies progressively from the beginning to the end of a cycle, and by utilizing the said pulses to control the operation of the oscillator both as a transmitter and as a receiver. The varying time spacing between the pulses is made to correspond to various distances within the operating range of the system and is utilized effectively as a measure of the distance of a signal-reflecting object whose presence may be detected. According to the preferred form of the invention, hereinafter described, two sets or series of pulses are utilized which have different frequencies of occurrence, or repetition rates, such that their time spacing increases progressively during each operating cycle, and one set of pulses is utilized to effect signal transmission while the other set is utilized to control the sensitivity of the oscillator as a receiver. When the time of travel of a signal to and from a reflecting object equals the time spacing between a pulse of the first set and a pulse of the second set, an indication is produced which apprises an observer of the presence and distance of the reflecting object.

The invention may be clearly understood from the following detailed description with reference to the accompanying drawings, in which;

Figure 1 is a block diagram showing the preferred embodiment of the invention;

Figures 2 to 7 are graphical illustrations of the various electrical pulses and voltages involved, the purpose of which is to facilitate a clear understanding of the operation of the system shown in Fig. 1; and Fig. 8 illustrates a modification.

Before proceeding with the detailed description of the illustrated embodiment, it should be noted that the present invention contemplates a novel combination or arrangement of electrical units, each of which per se is well known in the art. Consequently, it is deemed unnecessary to illustrate or describe in detail any of the component parts of the system. The block diagram of Fig. 1, together with the explanatory illustrations of Figs. 2 to 7, will enable a clear understanding of the invention.

Referring to Fig. 1, there is shown a high frequency antenna I which serves both as a transmitting antenna and as a receiving antenna, as is customary in systems of this general class. Connected to the antenna I through a suitable feed line and coupling network 2 is a high power oscillator 3 which supplies successive pulses or bursts of ultra-high frequency energy to the antenna for transmission therefrom, as will be well understood. The oscillator 3 is normally inoperative, and intermittent operation thereof is effected by pulses supplied thereto, to generate the desired R. F. signals. According to the present invention, the oscillator is made to serve both as a transmitter and as a receiver, this dual function being accomplished by means of the arrangement or combination of elements employed in the system, as hereinafter described.

A suitable modulator 4 is employed to modulate the oscillator 3 in response to pulses from two pulse generators 5 and 6, which may take the form of blocking oscillators or multivibrators. The generator 5 may be termed the "transmitting pulse generator," since the pulses therefrom serve to effect operation of the oscillator 3 to transmit the desired R. F. signals. The pulses from generator 5 may be of the order of one microsecond duration, and they may have a suitable amplitude determined by the associated shaper 7. The said pulses also have a predetermined frequency of occurrence, e. g., 10,000 pulses per second.

The pulse generator 6 may be termed the "receiving pulse generator," since the pulses therefrom serve to effect operation of the oscillator 3 as a very sensitive receiver at certain times, as will be described later. These pulses may have the same duration as those from generator 5 but they occur at a slightly different repetition frequency, preferably ten pulses per second less than the frequency of the pulses from generator 5, e. g. 9,990 pulses per second. A suitable shaper 8, associated with the pulse generator 6, serves to determine the amplitude of the pulses from said generator.

While, in the specific embodiment of the invention illustrated in Fig. 1, the pulses from generator 6 serve primarily as "receiver pulses" in that they control the sensitivity of the oscillator 3 at certain times, these pulses also cause transmission of R. F. signals which, however, in themselves are relatively ineffective as will be seen later.

In a broad sense, the purpose of the present invention is to produce successive signals in varying time-spaced relation, and to produce an indication whenever a received reflected signal coincides in time with the succeeding signal. This condition obtains whenever the time of travel or flight of a signal from the antenna 1 to a reflecting object and back is equal to the time interval between such transmitted signal and the succeeding signal. In this manner, an indication is obtained of the distance of the reflecting object from the transmitting and receiving apparatus.

In the illustrated system, a varying time relation exists between the signals generated in response to the pulses from generator 5 and the signals generated in response to the pulses from generator 6, due to the frequency difference between the said pulses. An indication is produced whenever the time of travel of a signal to and from a reflecting object is equal to the time interval between a transmitting pulse from generator 5 and a receiving pulse from generator 6. Thus the time interval between two successive pulses is utilized as a measure of the distance of the reflecting object. This will be understood more clearly from the later detailed description of the operation of the system.

A detector 9 is connected to the oscillator 3 so as to receive the output thereof. Connected to the detector is a suitable integrating network or device 10 which has a time constant that is long with respect to the duration of a pulse from generator 6 and short compared to the interval between successive pulses from said generator. There is also provided an automatic regeneration control (ARC) circuit or device 11 which is supplied with the average D. C. detector output and which serves to control the amplitude af the pulses from generator 6, which in turn determines the sensitivity of the oscillator 3 for a portion of the time interval between the signals transmitted in response to the pulses from generator 5. The automatic regeneration control may operate through the shaper 8, as indicated by the connection 12, or it may operate directly in conjunction with the oscillator 3. This arrangement causes the oscillator 3 to function as a sensitive regenerative receiver during the occurrence of the pulses from generator 6. The adaptation of the oscillator to serve as a superregenerative receiver is advantageous from the standpoint of reduction in weight of the equipment.

Prior radar systems have employed a superheterodyne receiver including a number of I. F. stages. Such stages are eliminated by the arrangement of the oscillator 3 to serve as a superregenerative receiver while, at the same time, retaining the necessary sensitivity for effective reception of object-reflected signals.

A suitable scanning indicator 13 is connected to the integrating device 10 and is controlled by a sweep initiator 14. The latter is controlled by the difference frequency of the pulse generators 5 and 6, being connected thereto as illustrated. Accordingly the sweep frequency is relatively low (the difference frequency preferably being ten cycles per second), and therefore the indicator 13 may take the form of any simple slow-scanning device. By reason of this feature, it is possible to employ such devices as moving neon tube indicators, mechanical oscilloscopes, and the like. If desired, however, the indicator 13 may take the form of a conventional cathode ray indication of the presence of a signal-reflecting object within the operating range of the system and the distance of such object from the radar apparatus.

Before considering the operation of the system, it should be noted that the output of the detector 9 consists of pulses of shorter duration than the modulating pulses applied to the oscillator 3, due to the time required for the oscillator to start oscillating. Furthermore, the duration of each output pulse is related to incoming or received signals impressed upon the oscillator circuit from the antenna. The larger the forced oscillation of the oscillator circuit due to incoming signals, the shorter the time required for the oscillator to reach appreciable amplitude and the longer the duration of the detected pulse. The integrating circuit 10 converts detector output pulses of the same amplitude but varying duration into pulses of varying amplitude and greater duration, which are supplied to the indicator 13.

The operation of the system of Fig. 1 may be more clearly understood with the aid of the explanatory illustrations of Figs. 2 to 7. In Fig. 2, there are represented separately the signal pulses from generators 5 and 6, respectively. The upper series of time-spaced pulses, designated by reference character 16, are those produced by generator 5, while the lower series of pulses, designated by reference character 17, are those produced by generator 6. The slight difference in frequency of the said pulses is apparent in this figure.

In Fig. 3, there is illustrated the composite train of pulses comprising the pulses from both of the generators 5 and 6. This figure clearly shows the varying time interval between each pulse 16 and the succeeding pulse 17, due to the above-mentioned frequency difference. If the pulses 16 have a repetition frequency of 10,000 and if the pulses 17 have a repetition frequency of 9,990 (there being a frequency difference of ten cycles per second as hereinbefore mentioned), then one of the pulses 16 will coincide with one of the pulses 17 every tenth of a second, as indicated by the broken line resultant pulse at the left hand side of Fig. 3. Following each such coincidence of a pulse 16 and a pulse 17, the pulses will be time-spaced and the time interval between each pulse 16 and the following pulse 17 will gradually increase until coincidence of the pulses again occurs. It will be realized of course that Fig. 3 is not intended to represent accurately the time duration of the pulses and the time interval between them. Actually the coincidence of two pulses occurs once for every thousand pulses from the generator 5, i. e. on every thousandth pulse 16, from which it will be readily apparent that it is impossible to illustrate the time relations accurately.

The sweep initiator 14 is triggered each time two of the pulses 16 and 17 coincide. Thus the sweep frequency of the indicator 13 is ten cycles per second, from which it will be seen that the scanning rate is slow in comparison to scanning rates normally employed.

The apparatus shown in Fig. 1 operates to produce an indication whenever a received reflected signal produced by one of the pulses 16 coincides in time with the succeeding pulse 17. Consider, for example, the signal or burst of R. F. energy caused by the pulse 16a in Fig. 3. If this signal travels to a reflected object and back to the antenna in a time which is not equal to the time interval 18, the reflected signal will not coincide with the succeeding pulse 17a, but will occur either between pulses 16a and 17x or between pulses 17a and 16b. Under these conditions the oscillator 3 will oscillate only for a short time, due to the small amplitude of the incoming signal and the low sensitivity of the oscillator. Hence there will be very little, if any, effect on the screen of the indicator. On the other hand, if the transmitted signal produced by pulse 16a travels to and from the reflecting object in a time equal to the time interval 18, the received reflected signal will coincide with the pulse 17a, and the oscillator 3 will oscillate for a relatively long time. The longer duration of the oscillations is due to the greater amplitude of the signal and is also due to the fact that the oscillator is caused to function as a sensitive regenerative receiver during the occurrence of the pulses 17, as previously described. Figs. 4a and 4b depict the short and long oscillatory actions of the oscillator 3 under the different conditions just mentioned. In Fig. 4b, the pulse 17a is enlarged or exploded along the time axis for purposes of illustration. The small shaded area 19 in Fig. 4a represents the short oscillations while the larger shaded area 20 in Fig. 4b represents the long oscillations.

Figs. 5a and 5b depict the rectification products of the short and long oscillations, as produced by the detector 9. The rectification voltage produced in response to the short oscillations of the oscillator 3 comprises a relatively narrow pulse 21 as shown in Fig. 5a, while that produced in response to the long oscillations of the oscillator comprises a relatively wide pulse 22 as shown in Fig. 5b. The integrating network 10 converts the output pulses of the detector into pulses of varying amplitude and greater duration, as represented at 23, and 24 in Fig. 6. The pulse 23 is that produced by pulse 22, while the pulse 24 shown in dotted outline is that produced by pulse 21.

Assuming that a reflecting object is within the operating range of the system, one or the other of the voltages represented in Fig. 6 will be derived after each burst of transmitted R. F. energy. One or the other of these voltages, therefore, will be supplied to the indicator 13. Only the larger voltage 23, however, will produce a substantial indication on the screen of the indicating device. Assuming that a cathode ray tube is employed as the indicator, the pictorial illustration produced on the screen in response to the voltage 23 of Fig. 6 will resemble the pulse 25 of Fig. 7. In this figure the portion 26 represents spurious voltage variations.

From the foregoing description it will be seen that the varying time interval between the pulses 16 and 17 in Fig. 3 is made to represent various distances of the reflecting object from the radar apparatus, and when said time interval corresponds to the distance of the object in any instance, an indication is produced on the indicator screen. Moreover, since the said time interval increases progressively, the point in the scanning cycle at which the said indication occurs will serve to indicate the distance of the reflecting object. This will be apparent from the position on the indicator screen at which the indicating pulse occurs.

While the system of Fig. 1 represents the preferred embodiment of the invention, an alternative arrangement may be provided in which a single pulse generator is employed in place of generators 5 and 6. In such case, a train of modulating pulses may be generated having a varying, e. g. increasing, repetition frequency, the varying time interval between successive pulses representing various distances of the reflecting object. This may be achieved by employing a sawtooth control voltage to produce the varying repetition frequency of the modulating pulses. Thus, the system of Fig. 1 may be modified as shown in Fig. 8 in which a pulse generator 27 has its frequency controlled by a sawtooth control voltage from the sawtooth voltage generator 28. The pulses from generator 27 are supplied to the modulator 4a through the shaper 29, to which the A. R. C. circuit may be connected. Aside from the modifications indicated the system may be the same as in Fig. 1.

While the invention has been described with particular reference to certain embodiments thereof, it will be understood that various modifications are possible without departing from the scope of the invention as defined in the appended claims.

I claim:

1. In a radio detecting and ranging system, a normally inoperative signal generator, a transmitting and receiving antenna connected to said generator, means for effecting intermittent operation of said generator so as to produce successive signals whose time-spaced relation varies cyclically, means for causing said generator to function as a sensitive receiver during the occurrence of certain of said signals, and means connected to said generator for producing an indication whenever a received signal coincides in time with one of the last-mentioned signals.

2. In a radio detecting and ranging system, a normally inoperative signal generator, a transmitting and receiving antenna connected to said generator, means for effecting intermittent operation of said generator so as to produce time-spaced signals having a predetermined frequency of occurrence, additional means for effecting intermittent operation of said generator so as to produce other time-spaced signals having a different frequency of occurrence, means for causing said generator to function as a sensitive receiver during the occurrence of said other signals, and means connected to said generator for producing an indication whenever a received echo or reflection of one of said first-mentioned signals coincides in time with one of said other signals.

3. In a radio detecting and ranging system, a normally inoperative oscillator, a transmitting and receiving antenna connected to said oscillator, means for effecting intermittent operation of said oscillator so as to transmit time-spaced signals having a predetermined frequency of occurrence, additional means for effecting intermittent operation of said oscillator so as to produce other time-spaced signals having a different predetermined frequency of occurrence, means for causing said oscillator to function as a sensitive receiver during the occurrence of said other signals, means supplied with the output of said oscillator for controlling the sensitivity of said receiver as a function of said output, and means supplied with the output of said oscillator for producing an indication whenever a received echo or reflection of one of said first-mentioned signals coincides in time with one of said other signals.

4. In a radio detecting and ranging system, a normally inoperative oscillator, a transmitting and receiving antenna connected to said oscillator, means for effecting intermittent operation of said oscillator so as to transmit time-spaced signals having a predetermined frequency of occurrence, additional means for effecting intermittent operation of said oscillator so as to produce other time-spaced signals having a different predetermined frequency of occurrence, means for causing said oscillator to function as a sensitive receiver during the occurrence of said other signals, a detector connected to said oscillator so as to receive the output thereof, an integrator connected to said detector, and an indicator connected to said integrator, whereby to produce an indication whenever a received echo or reflection of one of said first mentioned signals coincides in time with one of said other signals.

5. In a radio detecting and ranging system, a normally inoperative oscillator, a transmitting and receiving antenna connected to said oscillator, means including a first pulse generator for effecting intermittent operation of said oscillator so as to transmit time-spaced signals having a predetermined frequency of occurrence, means including a second pulse generator for effecting intermittent operation of said oscillator so as to produce other time-spaced signals having a different predetermined frequency of occurrence, means for causing said oscillator to function as a sensitive receiver during the occurrence of said other signals, means supplied with the output of said oscillator for controlling the effect of pulses from said second pulse generator on said oscillator, whereby to control the sensitivity of said receiver as a function of said output, and means supplied with the output of said oscillator for producing an indication whenever a received echo or reflection of one of said first-mentioned signals coincides in time with one of said other signals.

6. In a radio detecting and ranging system, a normally inoperative oscillator, a transmitting and receiving antenna connected to said oscillator, means for generating successive pulses having a predetermined frequency of occurrence, means for actuating said oscillator in response to said pulses, thereby to transmit successive signals from said antenna, means for generating other successive pulses having a different frequency of occurrence such that the time-spacing between the first-named pulses and the last-named pulses varies progressively during each operating cycle, means for causing said oscillator to function as a sensitive receiver during the occurrence of said last-named pulses, and means connected to said oscillator for producing an indication whenever a received reflected signal coincides in time with one of said last-named pulses.

7. In a radio detecting and ranging system, a normally inoperative oscillator, a transmitting and receiving antenna connected to said oscillator, means for generating successive pulses having a predetermined frequency of occurrence, means for actuating said oscillator in response to said pulses, thereby to transmit successive signals from said antenna, means for generating other successive pulses having a different frequency of occurrence such that the time spacing between the first-named pulses and the last-named pulses varies progressively during each operating cycle, a detector connected to said oscillator so as to receive the output thereof, means for causing said oscillator to function as a sensitive receiver during the occurrence of said last-named pulses, a scanning indicator connected to said detector, and means for effecting scanning of the indicator at a rate corresponding to the difference frequency of the first and last-named pulses.

8. In a radio detecting and ranging system, means for generating time-spaced signals whose time-spacing varies progressively from a first limit to a second limit and for repeating such generation of signals each time said time-spacing attains said second limit, scanning indicator means, means for initiating a scanning cycle of said indicator means each time said time-spacing attains said second limit, and receiver means for causing said indicator means to produce an indication whenever a received reflection of one of said signals coincides with the succeeding signal.

WILLIAM E. BRADLEY.

REFERENCES CITED

The following references are of record in the file of this patent:

UNITED STATES PATENTS

| Number | Name | Date |
| --- | --- | --- |
| 1,924,174 | Wolf | Aug. 29, 1933 |
| 2,333,688 | Shepard | Nov. 9, 1943 |
| 2,407,198 | Wolff | Sept. 3, 1946 |
| 2,415,095 | Varian | Feb. 4, 1947 |
| 2,417,136 | Smith | Mar. 11, 1947 |
| 2,419,569 | Labin | Apr. 29, 1947 |
| 2,422,382 | Winchel | June 17, 1947 |
| 2,431,344 | Reeves | Nov. 25, 1947 |
| 2,454,772 | Chatterjea | Nov. 30, 1948 |